(12) United States Patent
Khan et al.

(10) Patent No.: US 8,113,928 B2
(45) Date of Patent: Feb. 14, 2012

(54) SINGLE PIECE NOZZLE COVER DESIGN AND METHOD OF MANUFACTURE

(75) Inventors: Shafi N. Khan, Cicero, NY (US); Robert S. Simeone, Bridgeport, NY (US)

(73) Assignee: Carrier Corporation, Farmington, CT (US)

( * ) Notice: Subject to any disclaimer, the term of this patent is extended or adjusted under 35 U.S.C. 154(b) by 1112 days.

(21) Appl. No.: 11/886,765

(22) PCT Filed: Mar. 29, 2005

(86) PCT No.: PCT/US2005/010742
§ 371 (c)(1),
(2), (4) Date: Sep. 20, 2007

(87) PCT Pub. No.: WO2006/104491
PCT Pub. Date: Oct. 5, 2006

(65) Prior Publication Data
US 2009/0053039 A1    Feb. 26, 2009

(51) Int. Cl.
*F24F 7/06* (2006.01)
(52) U.S. Cl. .................................................... 454/338
(58) Field of Classification Search .................. 454/338, 454/299, 297, 219, 89, 118, 233; 264/219
See application file for complete search history.

(56) References Cited

U.S. PATENT DOCUMENTS

| | | | |
|---|---|---|---|
| 3,848,654 A * | 11/1974 | Boyle et al. ..................... 164/34 |
| 4,702,156 A * | 10/1987 | Sano ............................. 454/313 |
| 5,035,579 A | 7/1991 | Yada et al. |
| 5,066,194 A | 11/1991 | Amr et al. |
| 5,487,639 A | 1/1996 | Asabuki et al. |
| 5,536,139 A | 7/1996 | Yamazaki et al. |
| 6,022,270 A * | 2/2000 | Bascaran et al. .............. 454/201 |
| 6,023,938 A * | 2/2000 | Taras et al. ...................... 62/296 |
| 6,276,923 B1 * | 8/2001 | Shingai et al. ................. 425/556 |
| 6,402,464 B1 | 6/2002 | Chiu et al. |
| 6,402,467 B1 | 6/2002 | Godichon et al. |
| 6,497,112 B1 * | 12/2002 | Simeone et al. ................ 62/407 |
| 6,679,682 B2 | 1/2004 | Lee |
| 6,685,446 B2 | 2/2004 | Marioni |
| 6,755,615 B2 | 6/2004 | Chapman |
| 6,932,562 B2 * | 8/2005 | Ross ............................ 415/55.1 |

* cited by examiner

*Primary Examiner* — Steven B McAllister
*Assistant Examiner* — Brittany E Towns
(74) *Attorney, Agent, or Firm* — Cantor Colburn LLP

(57) ABSTRACT

A blower wheel housing for an air conditioning system is formed of a single molded element having a base section and a nozzle section with included vanes having complex shapes. This is accomplished by employing a pair of mold core elements which together form a cavity into which a plastic material is injected to form the cover with its integral nozzle and vanes, and the mold core elements are then withdrawn in opposite directions but at an angle to the direction normal to the two mold core elements to thereby accommodate the complex shapes of the vanes. In one embodiment, the top wall of the nozzle is disposed at an acute angle to the longitudinal plane of the cover, and the mold core elements are also withdrawn in a plane that is parallel to this wall.

3 Claims, 7 Drawing Sheets

SINGLE PIECE NOZZLE COVER DESIGN AND METHOD OF MANUFACTURE

FIELD OF THE INVENTION

This invention relates generally to air conditioning for a mobile temperature controlled container and, more particularly, to a nozzle cover for an indoor air conditioning unit and method of manufacture.

A common approach for transporting perishable goods is by way of a mobile temperature controlled container, with the air conditioning system including an open outdoor unit and an enclosed indoor unit.

Many prior art systems for conditioning air for service mobile containers do not effectively distribute the conditioned air throughout the container. As a result, the temperature in the container may vary between zones that are too cool and zones that are too warm. A primary reason for poor distribution of conditioned air is the inability of the air conditioning unit to "throw" the conditioned air over the length of the container. Another is the unit's inability to distribute conditioned air uniformly in both a vertical and horizontal direction.

One approach to overcome the problem of inadequate distribution is an indoor unit as shown and described in U.S. Pat. No. 6,669,555, assigned to the assignee of the present invention, and incorporated herein by reference. The indoor unit in that patent includes a blower wheel compartment whose open side is closed by a cover having a main body for surrounding an impeller, and a nozzle section for receiving and distributing the cooled air into the container by way of a plurality of vanes disposed in the nozzle.

In the manufacture of the blower wheel compartment covers, the main body is formed by injection molding, but, since the vanes have a very complex curvature and each individual vane has a unique curvature, it is not possible to form the vanes at the same time the main body is formed. Rather, it has been necessary to form the vanes by a separate thermoforming process, with the vanes then being individually installed into axial slots formed in the rectangular section of the nozzle and secured in their installed positions. Thus, the present design includes multiple molding processes, seven different plastic parts, and 24 fasteners, all of which add to the complexity and cost of assembly. Further, efforts to obtain a single molded cover that included the nozzle and vanes resulted in the suppliers indicating an impossibility because of the shape of the vanes and the nature of their undercut did not allow the molded part to be drawn out of the mold.

SUMMARY OF THE INVENTION

Briefly, in accordance with one aspect of the invention, in order to accommodate the complex shape of the vanes, a pair of mold core elements are mated in such a way that they jointly define a cavity for molding a single element cover that includes a nozzle with integrally formed vanes and, the two mold core elements are withdrawn in such a manner as to accommodate the complex shape of the vanes.

In accordance with another aspect of the invention, the two mold elements are withdrawn in opposite directions along a plane that is at an angle to the molding machine axis, with the angle being in the range of 14 to 22°.

In accordance with yet another aspect of the invention the nozzle has a top wall and the mold elements are withdrawn in opposite directions in a plane that is parallel to the top wall.

In the drawings as hereinafter described, a preferred embodiment is depicted; however, various other modifications and alternate constructions can be made thereto without departing from the true spirit and scope of the invention.

DETAILED DESCRIPTION OF THE DRAWINGS

Figure 1:
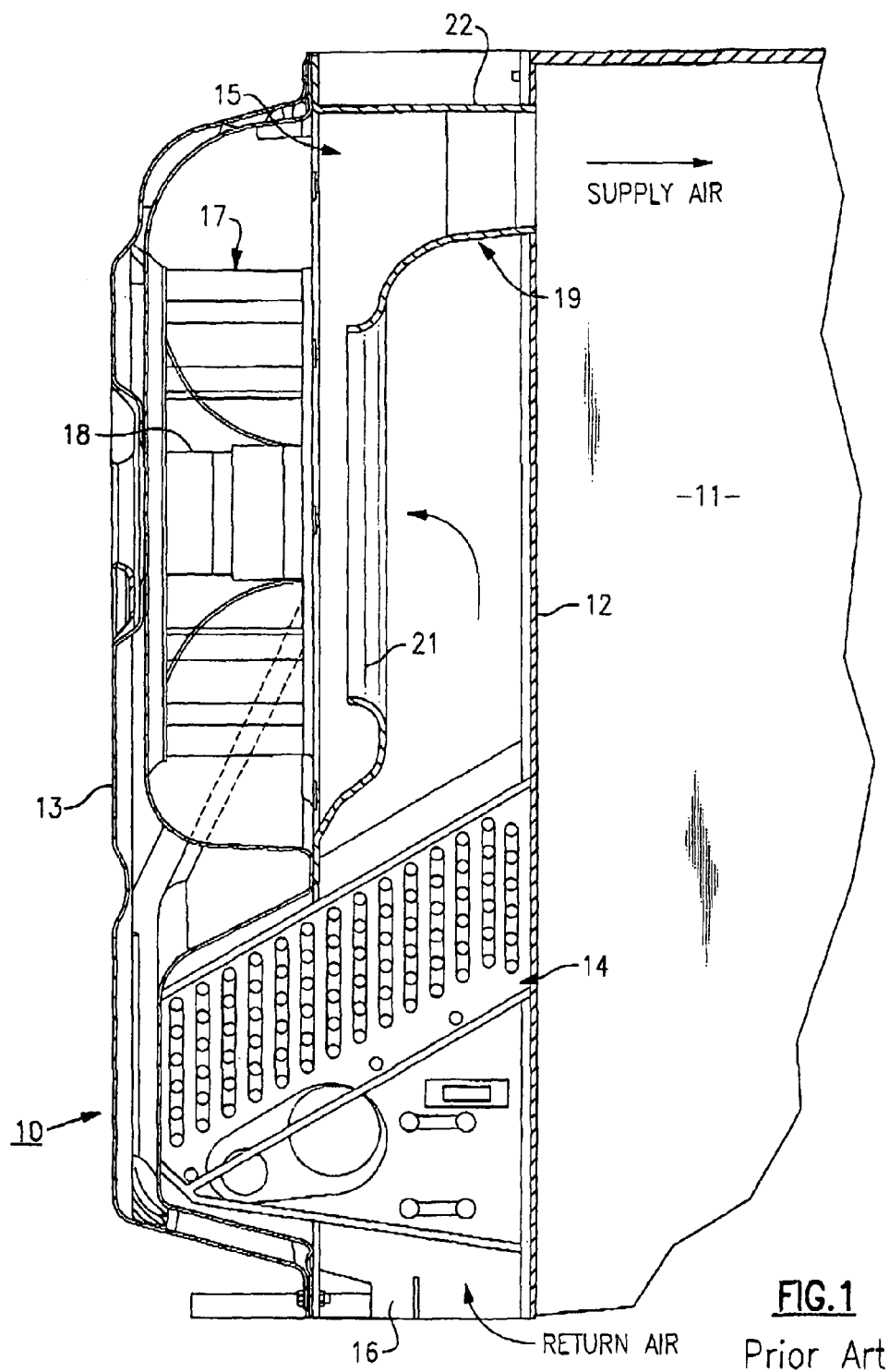
FIG. 1 is a side elevational view of an indoor section of a container air conditioning system in accordance with the prior art.

Referring now to FIG. 1, there is shown generally at 10 an indoor section of an air conditioning system for delivering conditioned air to the interior of a mobile temperature controlled container 11. The rear face of the indoor section 10 is closed by securing the rear of the indoor section 10 directly to a front wall 12 of the container 11. The front of the indoor section 10 is closed by means of a front wall 13.

A heat exchanger 14 is located in a lower portion of the indoor section 10, and a return air opening 16 is provided in a bottom wall of the indoor section 10. The return air inlet opening 16 extends across the width of the indoor section 10 beneath the heat exchanger 14. Although not shown, suitable ductwork is provided for conducting the flow of return air from the container 11 to the return air inlet opening 16.

In the upper portion of the indoor unit 10, a blower wheel 17 is mounted for rotation upon a shaft 18. The shaft 18 passes through the front wall 13 and is coupled to a suitable drive (not shown) for turning the blower wheel 17 at a desired speed to discharge air to a discharge area 15.

On the inner side of the indoor unit, a cover 19, with a circular opening 21 and a rectangular shaped nozzle 22, is provided.

In operation, the return air flows from the container 11 into the return air inlet opening 16. After passing through the heat exchanger 14, which either cools or heats the air as appropriate, the conditioned air passes through the circular opening 21 as indicated by the arrow, and enters the blower wheel 17 by way of its hub. The impeller blades increase the velocity of the flow and discharges the conditioned air into the nozzle 22, from which it is then distributed into the container 11.

Figure 2:
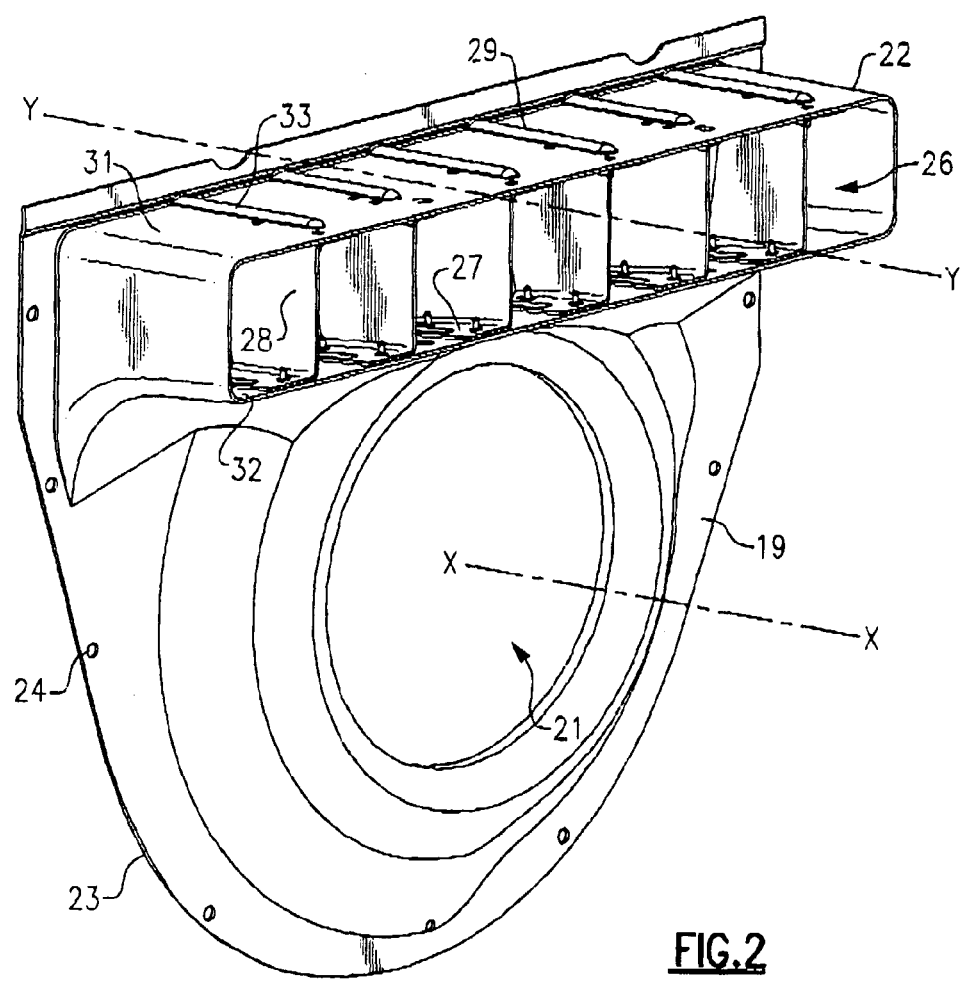
FIG. 2 is a perspective view of a blower wheel compartment cover element in accordance with the prior art.

For a more complete description of the cover 19, reference is made to FIG. 2. In addition to the rectangular shaped nozzle 22 at its top portion, the cover 19 includes a lower or base portion 23 which is appropriately shaped in its inner portion surrounding the circular opening 21 and is flattened out along its outer edges so as to be securable to a frame by fasteners passing through the openings 24.

The nozzle 22 contains a series of flow deflector vanes 26 with each vane being a z-shaped member having a lower flange 27 that is connected to a similar upper flange (not shown) by a generally vertically extending web 28. Each upper flange contains an elongated detent (not shown) that is received in an elongated slot 29 formed in the top wall 31 of the nozzle 22 as shown. The lower flange 27 of each deflector vane is similarly furnished with an elongated detent that is received in an elongated slot formed in the bottom wall 32 of the nozzle. The deflector vanes 26 are then secured in both the top and bottom walls by way of a plurality of rivets 33.

The webs 28 of each of the individual deflector vanes 26 are formed to a specific contour so that the individual webs cause the flow of conditioned air to be directed throughout the container in an optimized manner so that the air flow is uniformly distributed both vertically and horizontally across the container 11. Further, the webs 28 are formed as complex splines. For purposes of this description, the term "complex spline" shall mean that if a pair of mold cores are used to mold the vanes 26, the removal of the mold core elements along the y-y axis (i.e. parallel to the central x-x axis) will be prevented because of undercuts in the structure of the resulting vanes.

Figure 3:
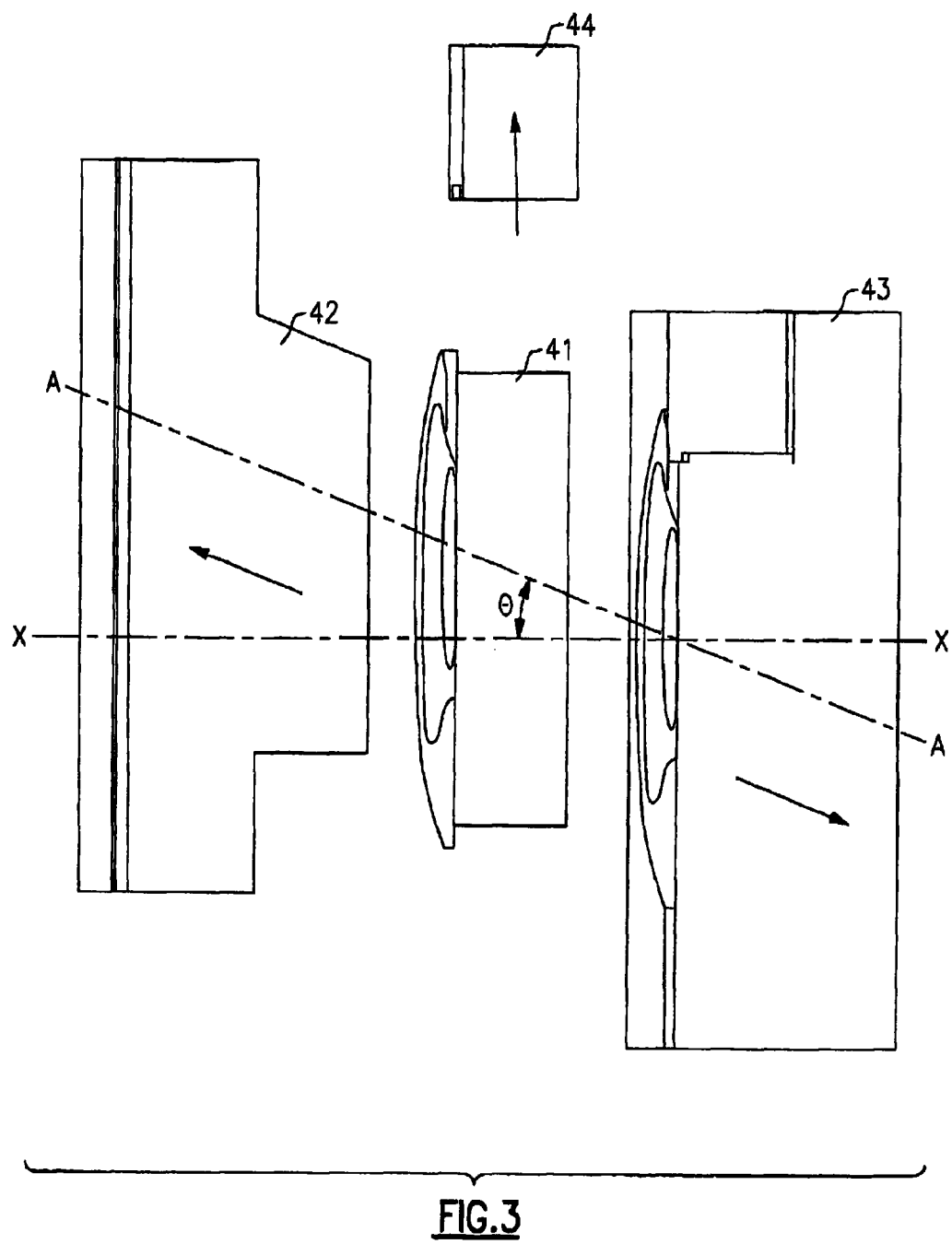
FIG. 3 is a top view of the mold components and the resulting molded element in accordance with the present invention.

Referring now to FIG. 3, in accordance with one aspect of the present invention, the mold components used to form the molded element (i.e. the blower wheel compartment cover) shown at 41 are shown at 42, 43 and 44. As will be seen, the mold components 42, 43 and 44 are shown in their withdrawn positions, resulting in the stand alone molded element 41. The arrows indicate the direction in which the mold components are withdrawn. Here it should be recognized that the mold components 42 and 43, rather than being withdrawn along the x-x axis as shown, are withdrawn in directions along the z-z axis or at an angle θ with the x-x axis. The purpose of withdrawing at such an angle is to accommodate the complex form of the vanes that are formed in the molded element 41 as will be more fully described hereinafter. The greater the curvature of the vanes, the greater the angle θ must be. For a typical vane structure, the angle θ is in the range of 14° -22°, and, preferably in the range of 14° to 16°.

Figure 4:
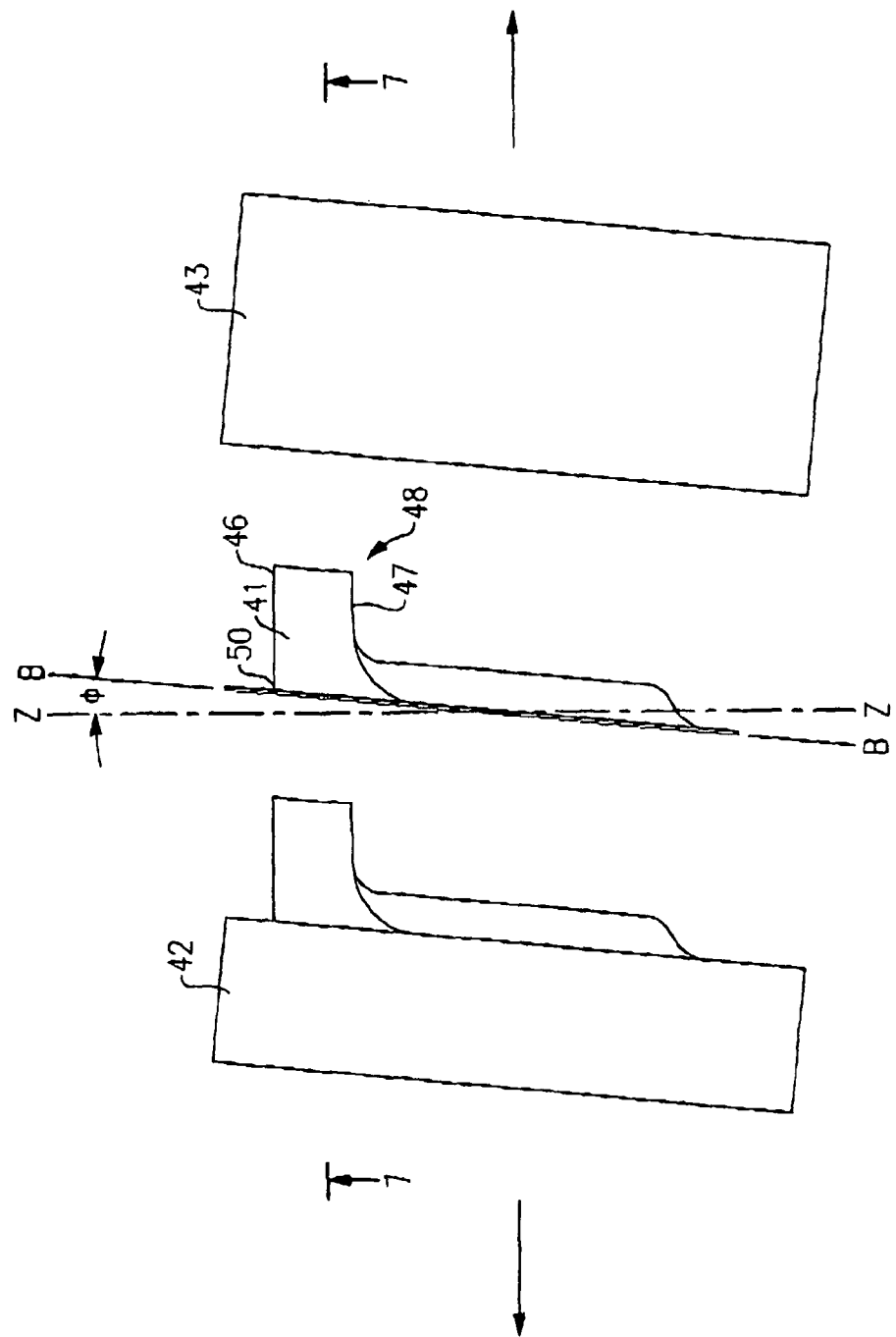
FIG. 4 is a side view thereof in the expanded condition.

Shown in FIG. 4 is a side view of the mold components 42 and 43 in their expanded positions to form the molded element 41. As will be seen each of the mold components 42 and 43, as well as the molded element 41 is tilted at an angle Ø from the vertical z-z axis as shown, with the mold component 42 and 43 being withdrawn in the direction indicated by the arrows. The need for this withdrawal angle is brought about by the orientation of the surface top wall 46 and its flange 50 of the nozzle 48 of the molded element 41. In other words, the top walls 46 is so disposed as to form an acute angle with the longitudinal axis B-B of the molded element, with the acute angle being 90° –Ø.

Figure 5:
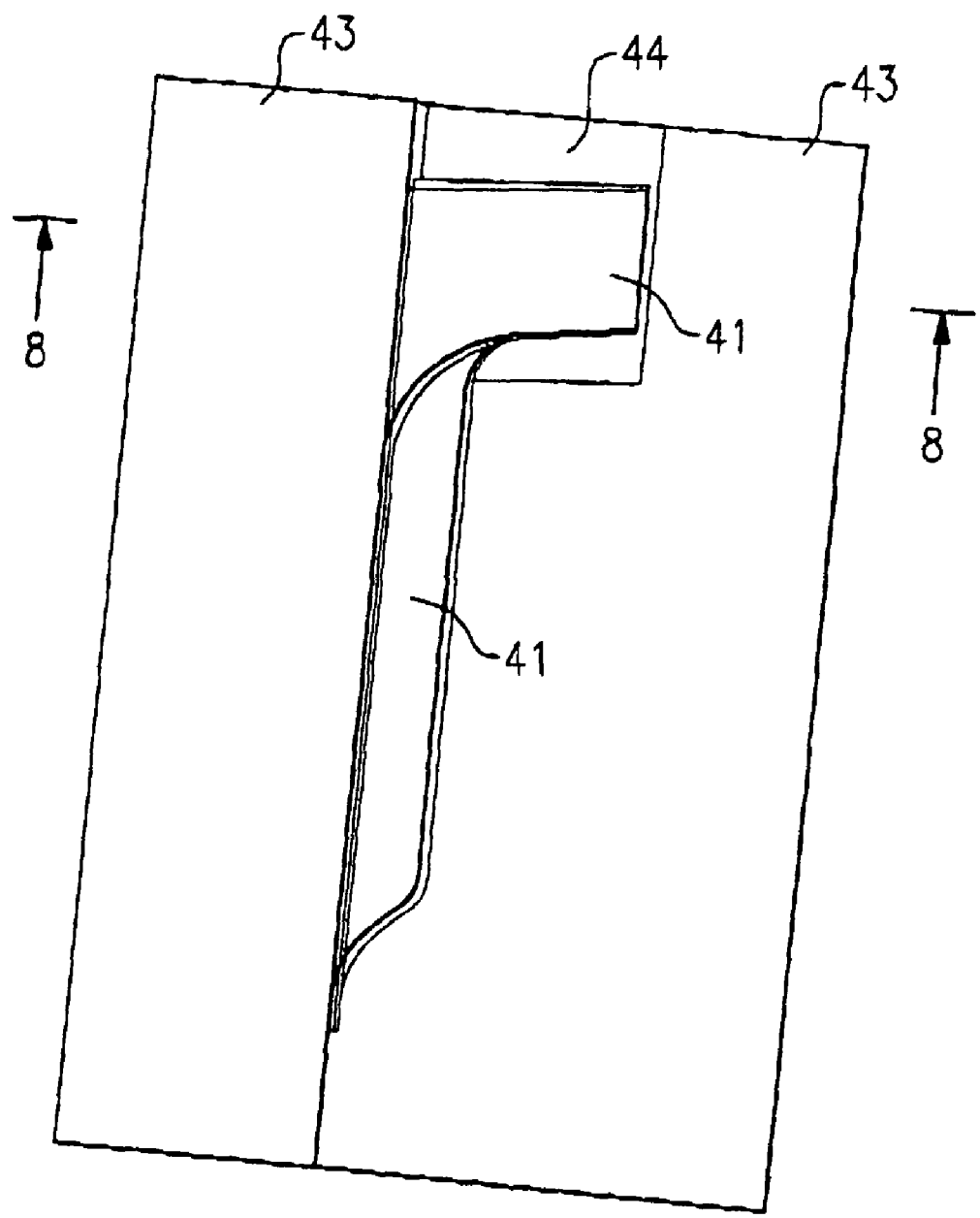
FIG. 5 is a side view thereof in a contracted condition.

A similar view of the mold components 42 and 43, together with the molded element 41 is shown in FIG. 5, with a mold component 44 also being shown. Here, the mold components are shown in their contracted positions after having the plastic material injected into the mold but before the mold components are withdrawn. The molded component 44 also is used to form the molded element 41 but is not involved in the formation of the nozzle as will be described hereinafter.

Figure 6:
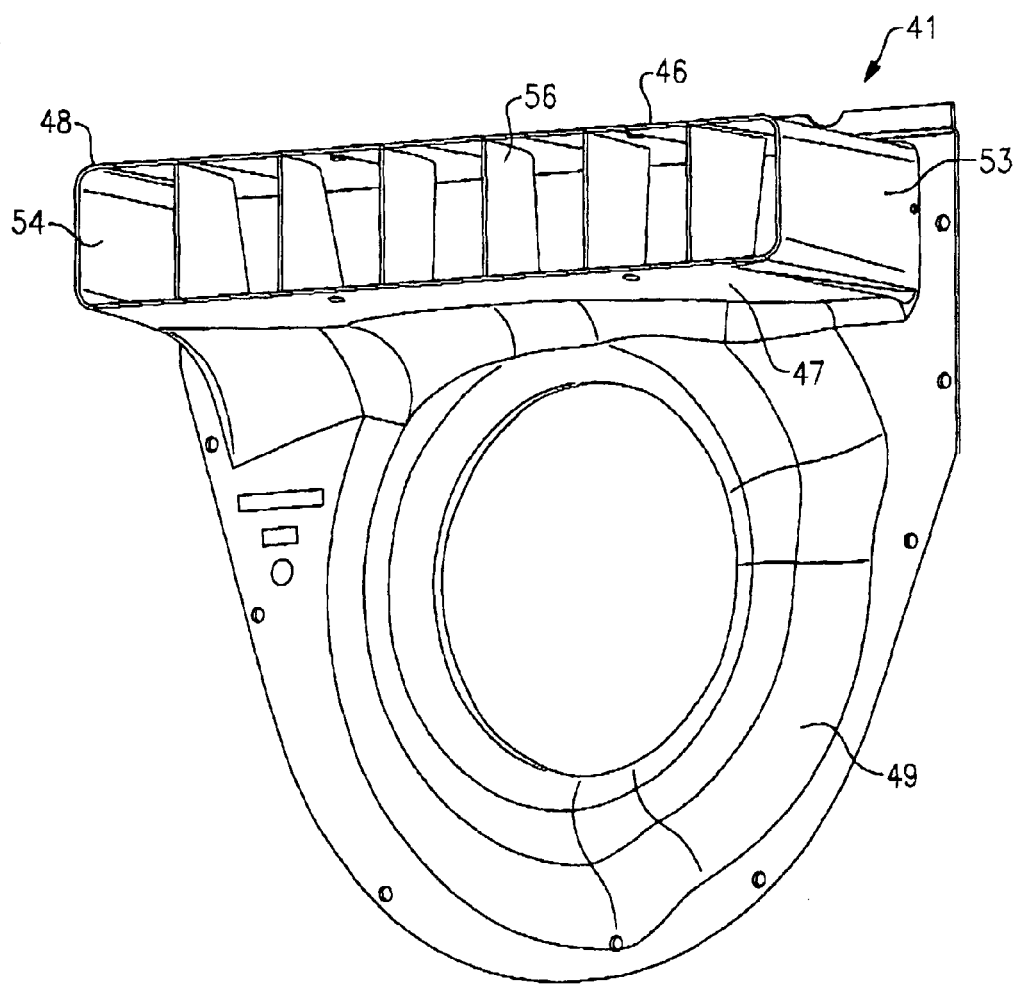
FIG. 6 is a perspective view of the molded element in accordance with the present invention.

Following the molding process, the mold components 42, 43 and 44 are removed in the manner as described hereinabove to thereby result in the molded element 41 as shown in FIG. 6. This structure is similar to the blower wheel cover 19 as shown in FIG. 2 but is entirely molded in a single integral piece as shown. Included is a base 49 with an integral nozzle 48 having a top wall 46 a bottom wall 47 and side walls 53 and 54. Also included as part of the nozzle 48, and integrally formed therewith, are a plurality of vanes 56.

Figures 7, 8:
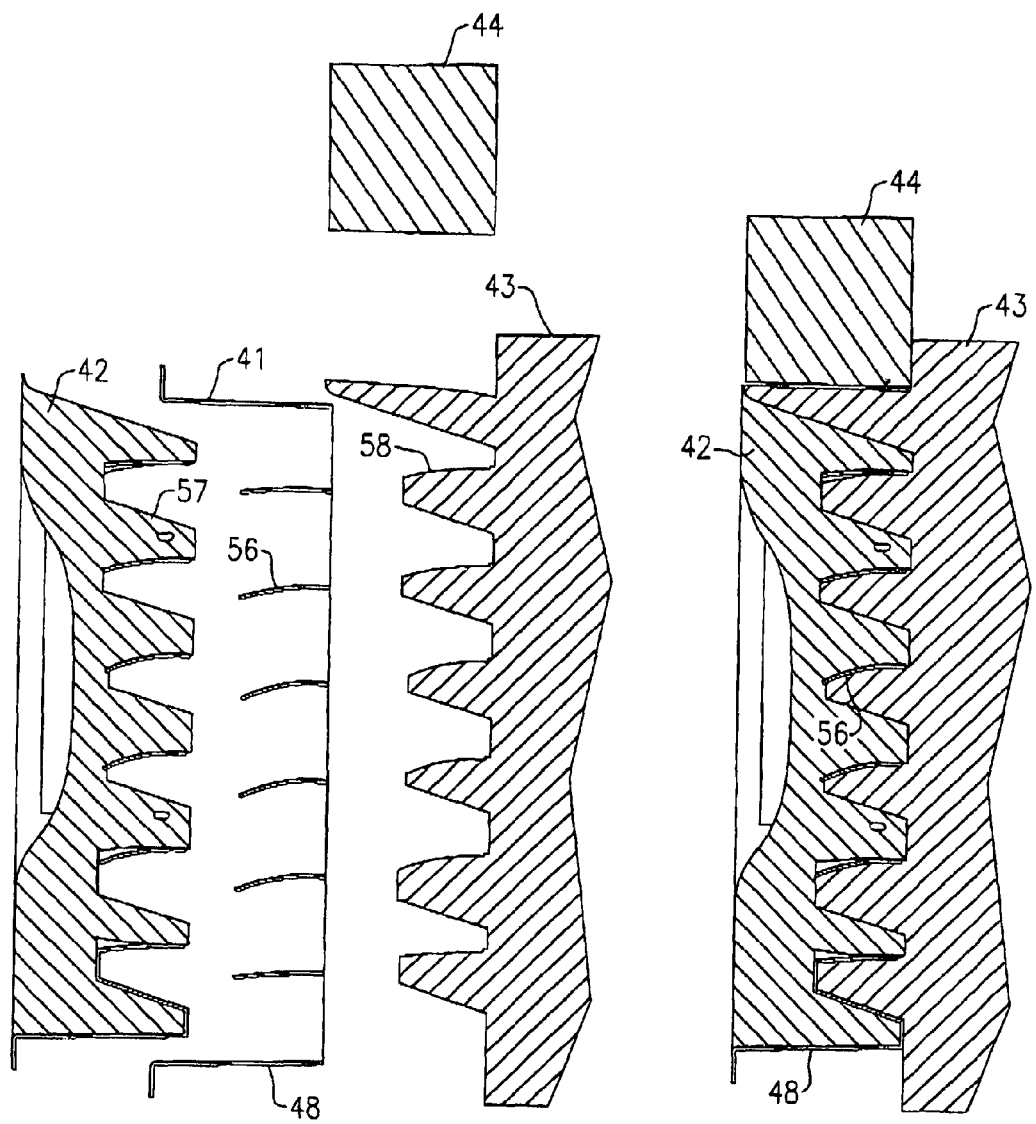
FIG. 7 is a sectional view as seen along lines 7-7 of FIG. 4.
FIG. 8 is a sectional view as seen along lines 8-8 of FIG. 5.

Referring to FIGS. 7 and 8, the vanes 56 are shown in cross section as formed between the teeth 57 of mold component 42 and teeth 58 of the mold component 53. FIG. 8 embodiment shows the nozzle structure 48 with its vanes 56 as formed when the mold component 42 and 43 are in mating relationship, and FIG. 7 shows the nozzle 48 in a stand alone position after the mold components 42 and 43 have been withdrawn. The mold component 44 is also involved in the process but does not play a role in the formation of the internal structure of the nozzle 48.

As will be seen in FIG. 7, the individual vanes 56 are arcuately formed and each has its own peculiar curvature or spline, with the purpose being that of obtaining the proper air distribution as the conditioned air leaves the nozzle 48. It is these "complex splines" that necessitate the molding process described hereinabove.

We claim:

1. A method as of forming a molded single piece cover (41) for a blower wheel compartment (10) of an air conditioning indoor unit, the cover (41) comprising a main body section (49) with an air inlet opening (51) and a rectangularly shaped nozzle section (48) for the discharge of conditioned air, the nozzle section (48) comprising a plurality of complex-shaped vanes (56) disposed in spaced relationship between a top wall (46) and a bottom wall (41) of the nozzle section (48), said method comprising:
    forming a pair of mold core elements (42, 43) which when brought together in engaging relationship define a cavity which replicates the shape of the cover (14);
    injecting a plastic material into said cavity; and
    withdrawing said pair of mold core elements (42, 43) in opposite directions along each of a plane parallel to said top wall (46) and a plane (a-a) which forms an angle (θ) with an axis (x-x) passing normally through the mold core elements (42, 43), said angle (θ) being in the range of 14° to 22°,
    wherein said to wall (46) is disposed at an acute angle to a longitudinal axis (B-B) of said cover 41,
    wherein each of said mold components comprise teeth (57, 58) between which a plurality of said complex-shaped vanes (56) are formed when the mold components (57, 58) are in mating relationship, and
    wherein each of the complex-shaped vanes (56) are arcuately formed with a spline that is different for each individual one of the complex-shaped vane (56).

2. A method as set forth in claim 1 wherein said angle (θ) is in the range of 14° to 16°.

3. A method of forming a molded single piece cover (41) for a blower wheel compartment (10) of an air conditioning indoor unit, the cover (41) comprising a main body section (49) with an air inlet opening (51) and a rectangularly shaped nozzle section (48) for the discharge of conditioned air, the nozzle section (48) comprising a plurality of complex-shaped vanes (56) disposed in spaced relationship between a top wall (46) and a bottom wall (41) of the nozzle section (48), said method comprising:
    forming a pair of mold core elements (42, 43) which when brought together in engaging relationship define a cavity which replicates the shape of the cover (14);
    injecting a plastic material into said cavity; and
    withdrawing said pair of mold core elements (42, 43) in opposite directions along each of a plane parallel to said top wall (46) and a plane (a-a) which forms an angle (θ) with an axis (x-x) passing normally through the mold core elements (42, 43),
    wherein said to wall (46) is disposed at an acute angle to a longitudinal axis (B-B) of said cover 41, and said mold core elements (42, 43) are titled at a minimum angle Ø=6° and said acute angle is equal to 90°–Ø,
    wherein each of said mold components comprise teeth (57, 58) between which a plurality of said complex-shaped vanes (56) are formed when the mold components (57, 58) are in mating relationship, and
    wherein each of the complex-shaped vanes (56) are arcuately formed with a spline that is different for each individual one of the complex-shaped vane (56).

* * * * *